United States Patent [19]

Jannin

[11] Patent Number: 4,912,886
[45] Date of Patent: Apr. 3, 1990

[54] PROTECTION DEVICE

[76] Inventor: Dennis R. Jannin, Rte. 5, Perryville, Mo. 63775

[21] Appl. No.: 364,856

[22] Filed: Jun. 12, 1989

[51] Int. Cl.⁴ .............................................. E04B 1/34
[52] U.S. Cl. ......................................................... 52/3
[58] Field of Search .................... 52/3, 4, 5, 529, 539, 52/533, 518, 519; 150/159; 206/83.5

[56] References Cited

U.S. PATENT DOCUMENTS

| 252,168 | 1/1882 | Angus . | |
|---|---|---|---|
| 404,577 | 6/1889 | Thatcher . | |
| 477,701 | 6/1892 | Rice . | |
| 627,051 | 6/1899 | Clark | 52/4 |
| 1,092,707 | 4/1914 | Freeland . | |
| 1,095,484 | 5/1914 | Wright . | |
| 1,462,212 | 7/1923 | Percsenyi | 52/529 |
| 2,812,813 | 11/1957 | Zarnowski | 52/529 |
| 4,041,654 | 8/1977 | Nedila | 52/96 |
| 4,783,944 | 11/1988 | Mendez | 52/518 |

FOREIGN PATENT DOCUMENTS 3433933  3/1986  Fed. Rep. of Germany ............ 52/5

Primary Examiner—David A. Scherbel
Assistant Examiner—Michele A. Van Patten
Attorney, Agent, or Firm—Haverstock, Garrett and Roberts

[57] ABSTRACT

This invention relates to a protection device adapted for protecting objects. Primarily, the protection device of this invention is intended to protect bales of hay, straw or similar materials. The protection device of this invention includes a series of overlapping elongated slats with projections on the side adapted to abut the bales being protected to insure that the protection device is slightly removed from the contents of the bales so that air may pass between the underside of the protection device and the surface of the bales being protected and means for attaching adjacent slats together to form the protection device.

12 Claims, 3 Drawing Sheets

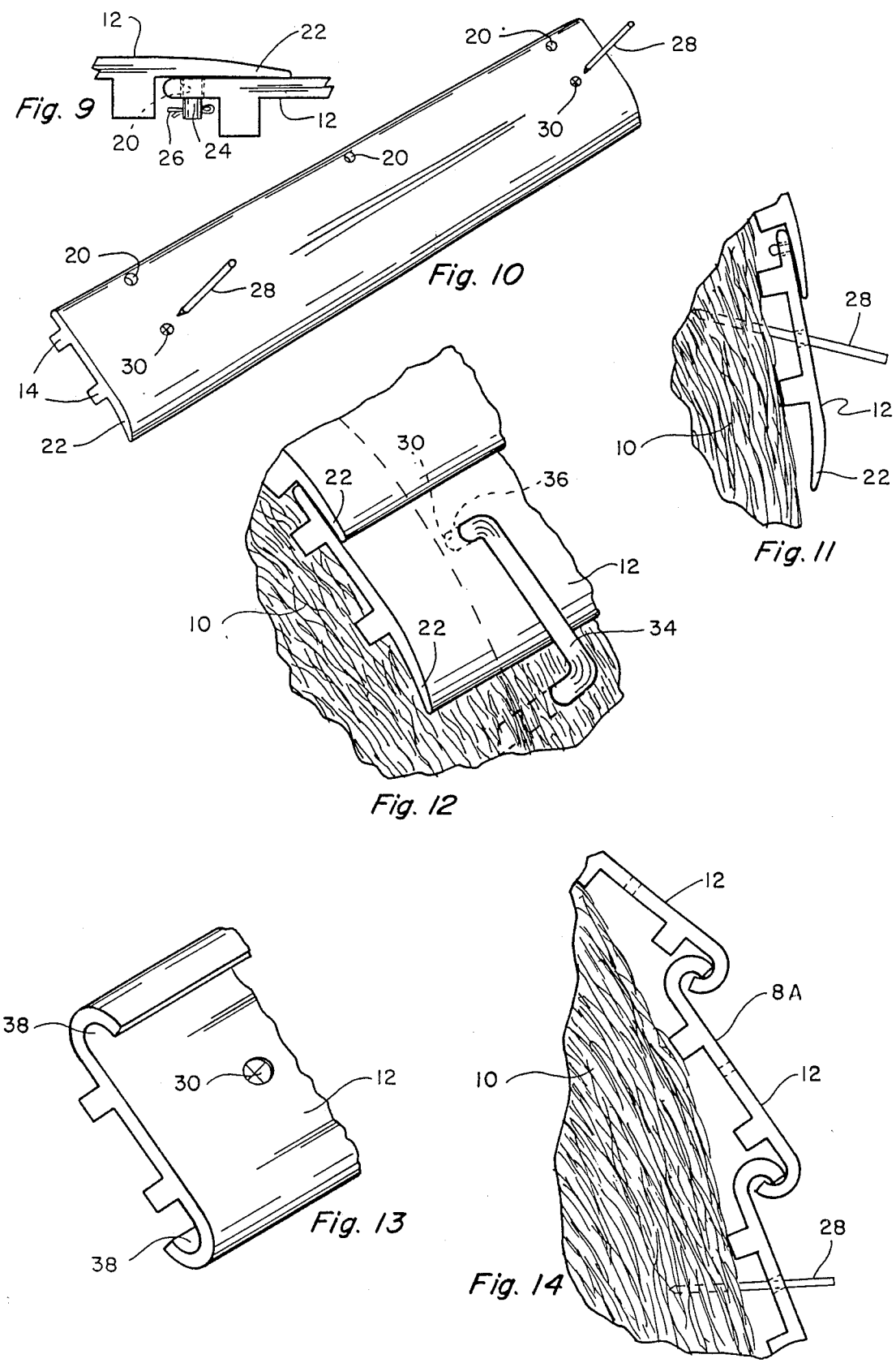

PROTECTION DEVICE

This invention relates generally to portable panel coverings for protecting products which may deteriorate from exposure to the elements, including bales of hay, straw or similiar materials.

BACKGROUND OF THE INVENTION

It is well known to store bales of hay, straw or similiar materials and the bales may be the traditional rectangular bales or round bales. Such bales may be stacked outdoors or indoors. When stacked outdoors, such bales tend to deteriorate as a result of rain, snow, wind and other elements. When stored indoors, such bales tend to deteriorate when stacked together because the continued curing of the products in the bales generates heat and moisture which results in deterioration which may be in the form of molds. It is sometimes necessary to discard parts of the bales before the products can be consumed by animals.

Many attempts have been made to protect stacks of baled products from the elements. For example, U.S. Pat. No. 252,168, patented by Angus in 1882, discloses a hay and grain cap made from a series of overlapping boards which are hooked together about the contour of the stack. U.S. Pat. No. 404,577, patented in 1889 by Thatcher, shows a hay cap made from slats being held in relative position by means of wires. U.S. Pat. No. 477,701 patented in 1892 by Rice, discloses another portable roof for protecting ricks or stacks of hay, straw or grain. U.S. Pat. No. 1,092,707 patented in 1914 by Freeland, discloses a self-adjusting hay cover formed of a plurality of sections and constructed of waterproof material such as galvanized sheet iron. U.S. Pat. No. 1,095,484, patented in 1914 by Wright, discloses a stack cover made from overlapping slats held in place by interlocking connections in the nature of hooks and eyes. U.S. Pat. No. 4,041,654 patented in 1977 by Nedila, discloses a cover for bales of hay and the like made from elongated panels adapted to be disposed on the top of a series of bales, each panel having means along its opposed longitudinal edge for engagement with additional panels which are disposed in side-by-side overlapping relationship with one another to cover the entire top of the stack of bales. This patent also discloses an anchor means for connecting the lower surface of the panel with the bales to secure the panel in place on the stack.

BRIEF SUMMARY OF THE INVENTION

This invention relates generally to a protection device in the nature of a portable panel covering for protecting products which may deteriorate from exposure to the elements, including bales of hay, straw or similiar materials. The protection device comprises a series of at least two elongated slats, the elongated slats having at least one projection on at least one surface adapted to insure that the protection device will retain at least one air passage between the protection device and the product being protected when the protection device is in place to protect the product. A flap along one edge of each of the elongated slats is adapted to overlap an abutting slat. The elongated slats have means for holding adjacent elongated slats in movable relationship with each other and means for connecting together a series of the elongated slats to form the protection device.

BRIEF DESCRIPTION OF SEVERAL VIEWS OF THE DRAWINGS

FIG. 9 shows an alternative method for attaching overlapping slats;

FIG. 10 shows a slat of the protection device with harpoons adapted to hold the protection device in place on the bale;

FIG. 11 shows a cross-section of a slat of the protection device held in place on a round bale with a harpoon;

FIG. 12 shows an alternative end hook in place to hold the protection device in place about a bale;

FIG. 13 shows a perspective of an alternative slat construction;

FIG. 14 shows a cross-sectional series of the slats of FIG. 13 in series about a bale and held in place by means of a harpoon.

DETAILED DESCRIPTION OF THE INVENTION

In FIGS. 1-14, like numbers are used to represent the same element.

Figure 1:
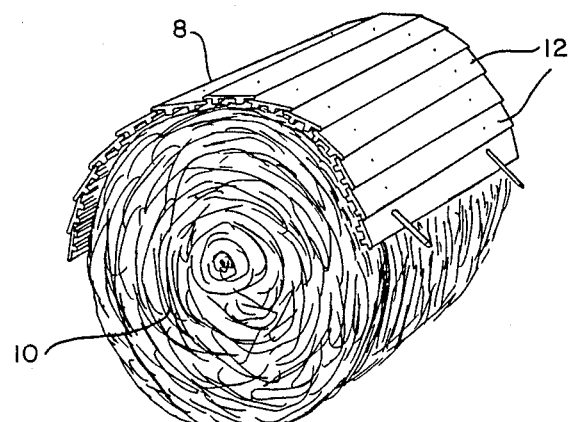
FIG. 1 is a perspective of a round bale showing the protection device of this invention in place on the bale.

With reference to FIG. 1, protection device 8 in place in bale 10 is shown in perspective with slats 12 in overlapping position to protect the content of bale 10.

Figure 2:
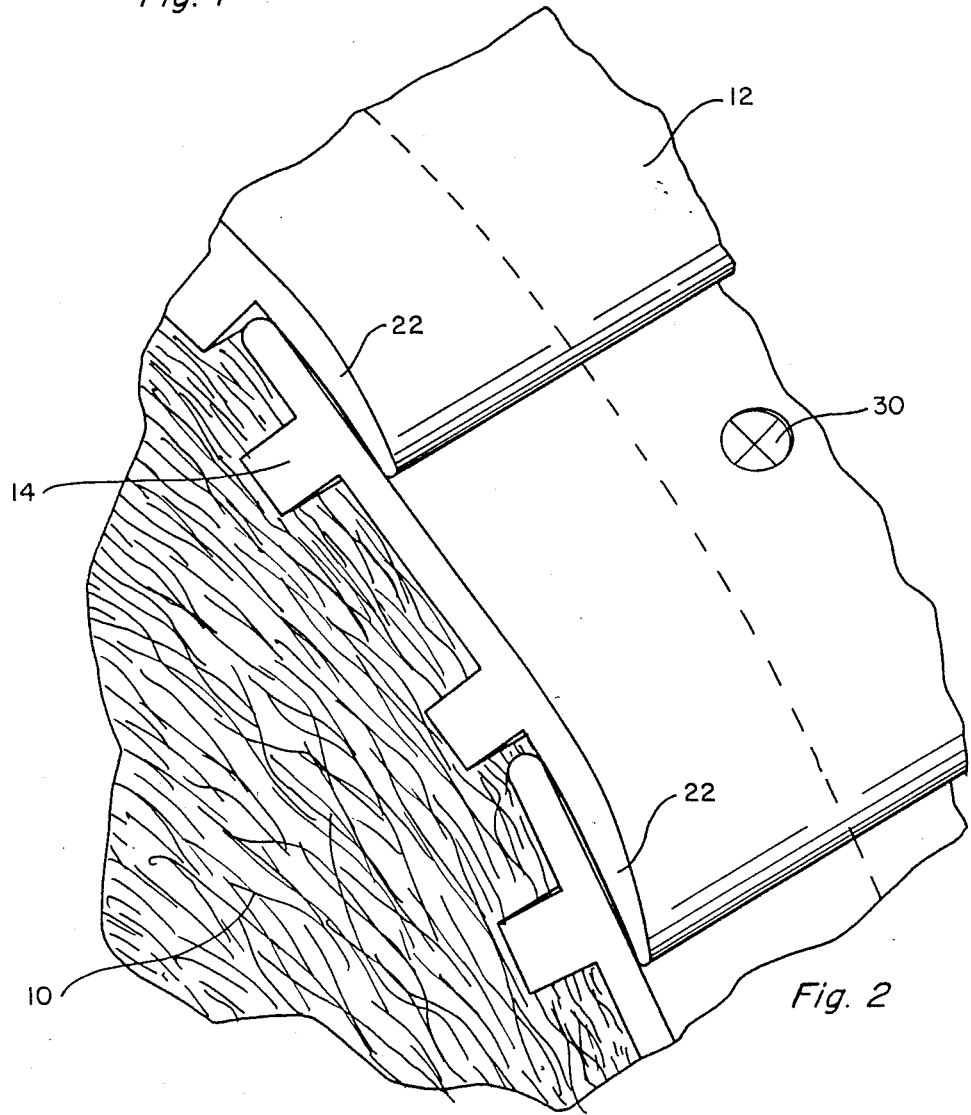
FIG. 2 is a partial end elevation of a round bale showing the protection device in place on the bale showing abutting slats in overlapping relationship.

FIG. 2 shows a partial end elevation of round bale 10 with slats 12 shown in overlapping relationship on bale 10.

Figure 3:
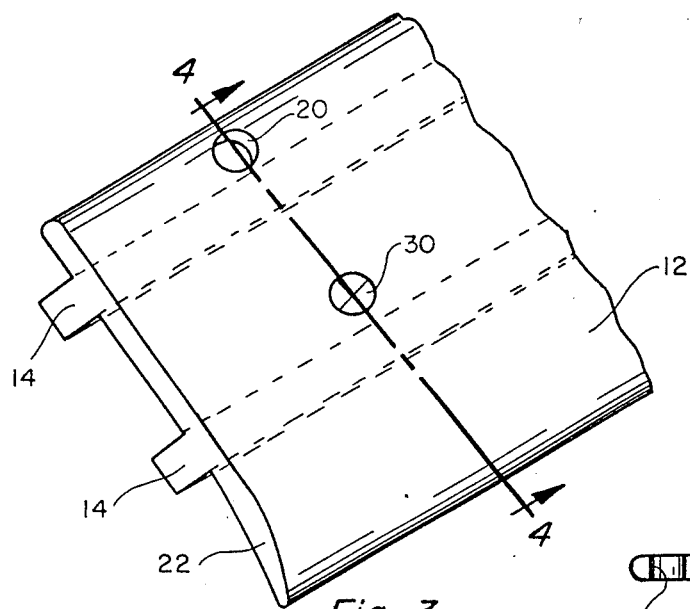
FIG. 3 is a perspective of one of the slats of the protection device shown is FIG. 2.
Figure 4:
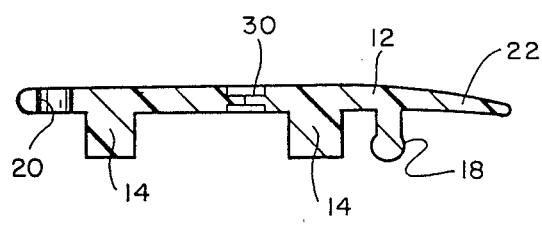
FIG. 4 is a cross-section of one of the slats of the protection device shown in FIG. 2 taken along lines 4—4 of FIG. 3.

FIG. 3 shows a perspective of slat 12 showing ridges 14 projecting from the surface of slat 12. The important function of ridges 14 is to provide an air space between the surface of bale 10 and the plane of slat 12 in order to provide space for air circulation, for dissipation of heat and the dissipation of any gases formed during the final curing.

Figure 5:
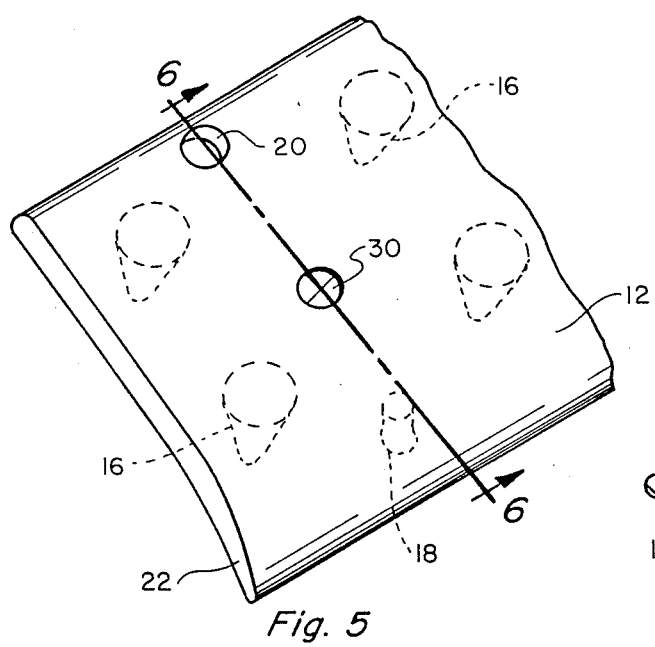
FIG. 5 is an alternative perspective similar to FIG. 3 showing projection bumps on a slat.

FIG. 5 shows an alternative embodiment of slat 12 showing bumps 16 as an alternative construction to ridges 14. Bumps 16 must be large enough to hold a slat away from bale 10 when in use to protect the contents of bale 10.

Figure 6:
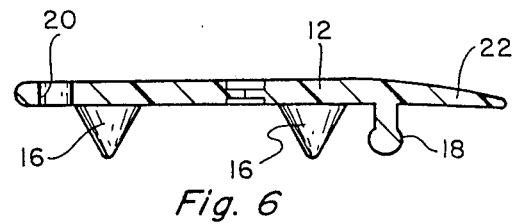
FIG. 6 is a cross-section of the slat shown in FIG. 5 taken along lines 6—6 of FIG. 5.

FIG. 6 is a cross-section of the slat shown in FIG. 5 taken along the line 6—6 showing bumps 16 on the surface of slat 12.

Figure 7:
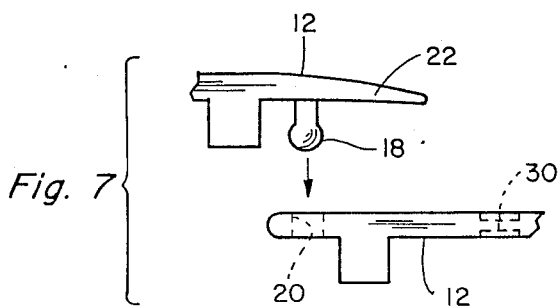
FIG. 7 shows a preferred means for attaching adjacent slats of the protection device in overlapping relationship.

FIG. 7 shows slat 12 with preferred locking knob 18 projecting from the lower surface of slat 12 and adapted for insertion into opening 20 in adjacent slat 12 in order to provide a positive but movable connection between two overlapping slats 12. Slat 12 preferable has a tapered flap 22 extending along the lateral edge of slat 12 so that flap 22 will overlap the opposite side of the adjacent slat 12 in order to form a tight weatherproof seal between the adjacent slats.

Figure 8:
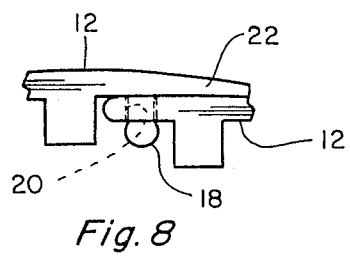
FIG. 8 shows the connection means in FIG. 7 with adjacent slats attach to each other.

FIG. 8 shows a pair of adjacent slats 12 with knob 18 inserted in interlocking relationship through opening 20.

FIG. 9 shows an alternative device for attaching adjacent slats 12 by inserting a projection post 24 through opening 20, the abutting and overlapping slats 12 held in place by means of key 26.

FIG. 10 shows slat 12 with ridges 14 and with openings 20 which are adapted to receive locking knobs 18. Harpoons 28 are shown in perspective for insertion through holes 30 into the bale to hold protection device 8 in position on bale 10. It will be generally necessary to use at least two harpoons 28 on each outer periphery of a series of interlocking slats 12 to hold protection device 8 in place on bale 10. However, it may be possible to dispense with harpoons 28 if the bale being protected is in a sheltered place away from winds. Also, it may be necessary to use more peripheral harpoons to hold a series of overlapping slats 12 in place on bales 10 if bales 10 are being stored in the outdoors where high winds might have a tendency to blow overlapping slats 12 off of bale 10 and thus expose bale 10 to the ravages of the weather. Also additional harpoons may be inserted in holes 30 of other than end slats 12 as needed.

Holes 30 may preferably be closed by means of a thin sheet of polymeric material. When the slat is molded from a polymeric material, holes 30 may be molded in place as a thinned area and will preferably have cross slots which will open and close as harpoons 28 are inserted and removed. Slats 12 made from metal or wood may have holes 30 closed with a polymeric material plug having a thinned center with cross slots cut therein.

FIG. 11 shows harpoon 28 in place to hold slat 12 in position on bale 10.

FIG. 12 shows an alternative device for holding protection device 8 in place wherein hook 34 has one end 36 projecting through opening 30 and projecting over the edge of slat 12 and projecting into bale 10 to hold the series of slats 12 of protection device 8 in position about bale 10.

FIG. 13 shows S-curve slat 38, an alternative embodiment of slat 12 which includes S-curves which can be hooked together in series to form bale protection device 8A.

FIG. 14 shows a series of S-curve slats 38 in position to form S-curve protection device 8A about bale 10 and held in place by harpoon 28.

The protection device of this invention includes a series of at least two slats and will normally include a series of several slats required to cover the bale or bales being protected. The slats made be of any desired width. Preferably, they will be narrow enough to be easily handled, from about four inches wide to about twelve inches wide. For certain uses the slats may be wider, up to about two feet wide or even wider. The length of the slats may be varied depending on the nature of the bales being protected. For stacks of regular rectangular bales the length of the slats will generally be about three to about six feet in length. For round bales, the slats will generally be about four to about eight feet in length.

It is an important function of this invention to provide an irregular surface on the underside of the slats which will be adjacent to the bales in order to provide space for air circulation between the surface of the bale and the under surface of the slats of the protection device. The projections on the under surface of the slats may be of any configuration. One or more, preferably about two or three, ridges will provide for air circulation over the surface of the bales being protected. The nature of the contents of the bales may result in the contents fluffing up into the interstices between the projections but there will be always a path of air circulation between the surface of the bales and the under surface of the slats.

Although ridges are preferred projections on the under surface of the slats, other types of projections may be used. A series of bumps may accomplish the same result and the bumps may be in parallel lines or they may be random upon the under surface of the slats. Other types of projections or combinations of projections may be used as long as such projections provide the required space for air circulation between the surface of the bales and the under surface of the slats.

The thickness of the slats which make up the protection device of this invention need only be thick enough to provide adequate support. Depending on the nature of the material of construction, the thickness of the slats may be as thin as one quarter inch or less and as thick as about one inch of more.

The slats which comprises the protection device of this invention are preferably made from polymeric materials and the preferred polymeric materials are polyolefins such as polyethylene and polypropylene. Other polymeric materials may be used such as polyvinyl chloride resins, butadiene-styrene rubber compositions, natural rubber compositions, etc. For particular uses, it might be desirable to use more expensive and more rigid polmeric materials such as polycarbonates, reinforced nylons, etc. Also, the slats may be made from metals such as sheet aluminum, steel, treated iron sheets, etc. The slats may also be made of wood, in which case it may be necessary to attach the projections to the under side of slats by means of screws, nails, etc.

The slats of this invention must be attached to each other in any manner which prevents entry of rain and other elements between the slats and through the openings for holding means for attaching the projection device to the bales. A preferred attachment, particular for slats made of polymeric materials, would be at least one knob near one edge of each slat which would mate with an opening near the opposite side of an adjacent slat so that the knob may be snapped into the opening to form a tight seal but which would allow flexibility between the slats so that the slats may wrap around the bales being protected regardless of the configuration of the bales. Other types of attachments may be used such as a post and key. Other attaching devices may be used and will depend on the composition of the slats. For example, flexible cords of wire or rope may be used to hold the slats in position relative to each other by interlacing the parallel slats through openings or through projection.

Slats prepared from polymeric materials may be preferably made by injection molding but could also be made with a customary extrusion process. Slats made from metals would be preferably stamped from patterns. Slats made from wood would preferably be made from cut pieces such as redwood with the projections attached in any conventional manner.

A particular feature of the present protection device is the fact that the slats which comprise the protection device are individually fabricated so that they may be stored in convenient stacks and so that any desired number of slats may be hooked together to form a protection device for bale or bales being protected. For example, rectangular bales might be stacked in multiple parallel or random stacks which would require a protection device with a particular multiple of slats. Large round bales may be stored individually or stored in a series, in which case it might be desirable to extend the protection device to cover more then one round bale. Also, the protection device of this invention might be used for purposes other than protecting bales of straw, hay or similar materials. For example, the protection device might be used to protect animals, such as pigs, by placing the protection device about a frame work inserted into the ground. The uses could include protecting domestic animals such as dog, cats etc. from the elements.

In preparing the slats which comprise the protection device of this invention, particularly when the slats are made from polymeric materials, it is desirable to provide a tapered overlap preferably along the edge nearest where the attachment projection knob is located. This will help prevent elements such as rain from blowing in between the overlapping slats.

Thus, there has been shown and described a novel protection device which is particularly adapted to protect bales of straw, hay or similar materials. It will be apparent to those skilled in the art, however, that many changes, variation and modification of the subject protection device assembly are possible and or contemplated, and all such changes, variation and modification which do not depart from the spirit and scope of the present invention are deemed to be covered by the invention which is limited only by the claims which follows.

What is claimed is:

1. A protection device adapted to protect products subject to weather deterioration comprising a series of at least two overlapping elongated slats, said elongated slats having projection means on a side adapted to be adjacent said products to insure that said protection device will retain air passage between said protection device and said products being protected when said protection device is in place to protect said products, and having a flap along one edge of each of said elongated slats adapted to overlap an abutting slat, said elongated slats having means for holding adjacent elongated slats in movable relationship with each other and means for connecting together a series of said elongated slats to form said protection device.

2. The protection device of claim 1 wherein said projection is at least one ridge.

3. The protection device of claim 1 wherein said projection is a series of bumps.

4. The protection device of claim 1 wherein each of said elongated slats has at least one thinned space with slots cut therein adapted to having a harpoon projected therethrough and into a bale in order to hold said protection device in place on said bale.

5. The protection device of claim 1 wherein each of said elongated slats has means for connecting adjacent elongated slats to each other.

6. The protection device of claim 5 wherein said connection means is comprised of at least one knob projecting from said elongated slat and adapted to mate with an opening in an adjacent elongated slat to form an attachment to hold adjacent elongated slats in waterproof but flexible connection.

7. The protection device of claim 5 wherein said elongated slat has a lip of decreasing cross-section extending along one side thereof which is adapted to overlap the opposite side of an adjacent elongated slat in order to provide a waterproof connection therefor.

8. The protection device of claim 1 wherein said elongated slat is in the form of an elongated S-configuration.

9. The protection device of claim 1 wherein said elongated slat is made from a polymeric material.

10. The projection device of claim 1 wherein said elongated slat is made from a metal.

11. The projection device of claim 1 wherein said elongated slat is made from wood.

12. A method of protecting products such as bales of hay, straw or other materials from the elements by covering said bales with a protection device comprising a series of at least two overlapping elongated slats, said elongated slats having projection means on the side adapted to be adjacent said products to insure that said protection device will retain at least one air passage between said protection device and said products being protected when said protection device is in place to protect said products, and having a flap along one edge of each of said elongated slats adapted to overlap and protect an abutting slat, said elongated slats having means for holding adjacent elongated slats in movable relationship with each other and means for connecting together a series of said elongated slats to form said protection device.

* * * * *